Aug. 31, 1954  F. G. S. ENGLISH ET AL  2,687,644

STATISTICAL RECORD VERIFYING APPARATUS

Filed June 15, 1951

Inventor
Francis G. S. English
William E. Johnson
By
[signature]
Attorney

Patented Aug. 31, 1954

2,687,644

UNITED STATES PATENT OFFICE 2,687,644

STATISTICAL RECORD VERIFYING APPARATUS

Francis Guy Sydenham English, Corydon, Highwold, Chipstead, and William Edward Johnson, London, England, assignors to Powers-Samas Accounting Machines Limited, London, England, a British company Application June 15, 1951, Serial No. 231,856

Claims priority, application Great Britain June 26, 1950

1 Claim. (Cl. 73—156)

This invention relates to statistical machines and in particular to machines for verifying the accuracy of holes punched in a statistical record card or the like.

In United States specification No. 1,969,332 there is described a method of and apparatus for producing statistical record cards in which the records are produced in two stages, for example in producing perforated record cards, the record perforations are produced in two punching steps, each step being effected in a punching machine in which the operator produces perforations according to data in an original entry, the perforations in the one stage being complementary to the perforations in the other stage.

By this method of producing records, the occurrence of errors by way of incorrect punching or the omission of punching in either stage is immediately obvious on sight of the card as the record is incomplete.

In the aforesaid specification there is described for producing complementary stages of punching, a normal punching machine with an adjustable feed for the cards, the machine employed in one of the stages being offest as regards the normal feed so that the outlines of the completed perforations comprise an elongated hole whereas if a punching on either machine has not found a complementary operation on the other machine there will be left a normal, e. g. a circular, hole which at once identifies an error in one or other of the punching stages.

In United States specification No. 1,984,516 there is described an apparatus for testing cards punched with complementary perforations and it is an object of the present invention to provide a new or improved form of apparatus for testing the complementary punching in a record.

As is well known in the art, a statistical record card is provided with a predetermined number of horizontal rows and a predetermined number of vertical columns defining at their points of intersection index positions at which perforations can be punched to record data on the card. To increase the capacity of the card, the spaces between the horizontal rows of index positions are sometimes employed to receive other horizontal rows of perforations, the index positions in such other horizontal rows being known in the art as interstage positions. Cards employing normal and interstage index positions are referred to below as interstage cards.

When an interstage card is employed and is provided with records comprising complementary perforations, it has heretofore been a matter of some difficulty so to arrange the complementary punching that the punching in one normal horizontal row does not overlap the punching in the adjoining interstage row. This problem does not occur if only normal perforations are provided in the normal and interstage rows, but renders difficult the operation of testing or verifying by complementary punching. It is an object of the present invention to provide testing mechanism whereby a record card may be provided with complementary punching in normal and interstage horizontal rows and the records so formed tested mechanically and in which the sizes of the complementary perforations are so reduced from those previously employed that when punched in both normal and horizontal rows in the same column records will not overlap. The mechanism according to the invention can, however, be employed for testing normal punching in cards which are punched only in normal horizontal rows or only in interstage horizontal rows.

In order that the invention may be clearly understood an embodiment thereof will now be described by way of example with reference to the accompanying diagrammatic drawings, in which.

Figures 1, 2, 3, 4:
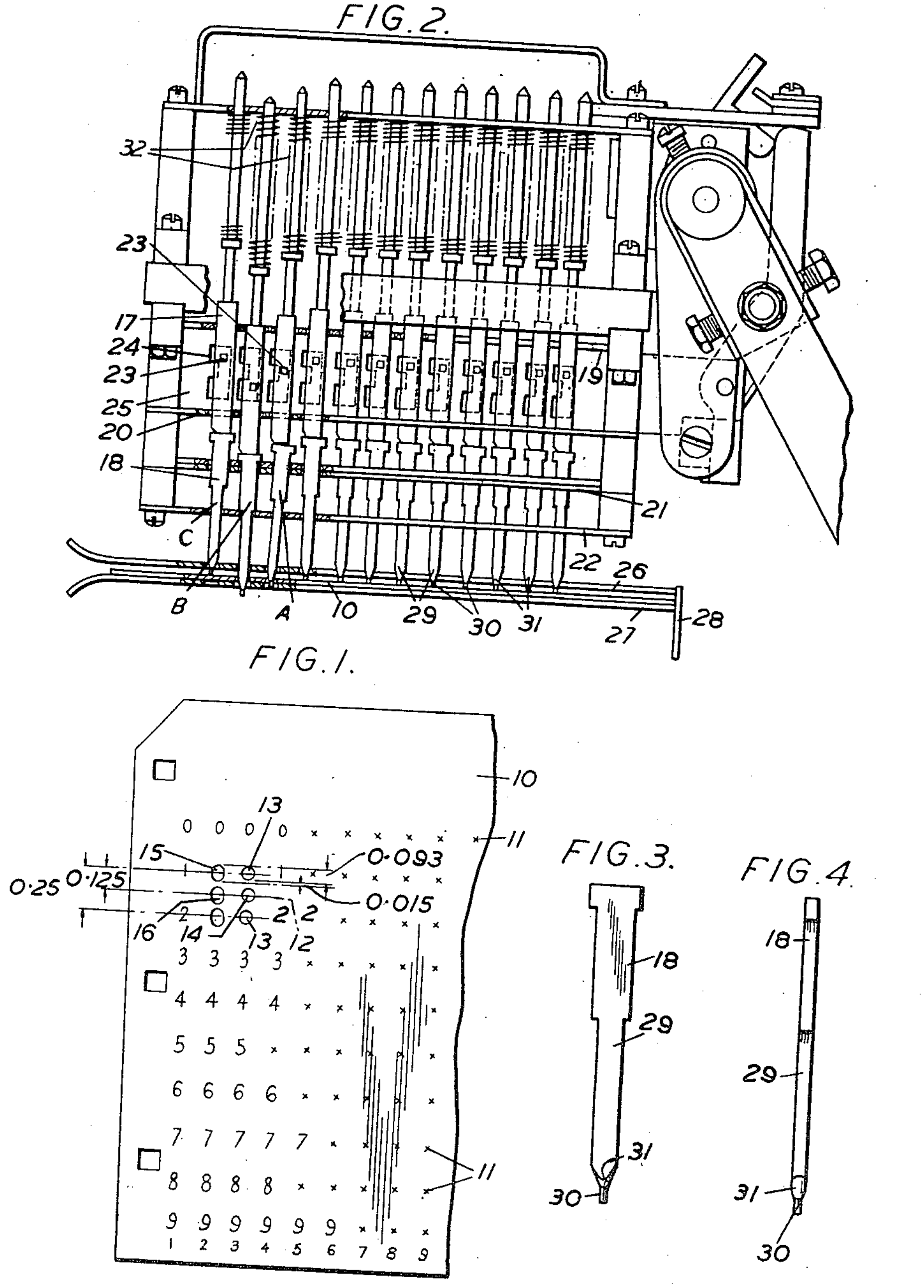
Figure 1 shows a part of a statistical record card and illustrates the manner in which complementary and normal holes are formed in normal and interstage index positions.
Figure 2 is a diagrammatic and part sectional elevation of a pin box according to the present invention for testing records punched in statistical cards.
Figure 3 is a front elevation, to an enlarged scale, of the lower end portion of a sensing pin shown in Figure 2.
Figure 4 is a side elevation of Figure 3.

Referring to Figure 1, a statistical record card 10 is provided with normal horizontal rows 11 each containing index positions and between the normal horizontal rows are interstage horizontal rows 12 also containing index positions. The vertical spacing between the normal horizontal rows is 0.25 inch between the centers of normal round holes 13 which may be punched therein. As can be seen from Figure 1, the distance between the centers of normal round holes punched in normal horizontal rows and normal round holes 14 punched in interstage horizontal rows is half the aforesaid distance, thus the center line for interstage holes is disposed at 0.125 inch from the center line of the normal horizontal rows on either side of it. In Figure 1, the normal perforations 13 and 14 in normal and interstage horizontal rows respectively are shown in vertical column No. 3 and in vertical column No. 2 are shown elongated holes 15 and 16 which are formed by complementary punching in the manner described in the aforesaid United States specification No. 1,969,332. The distance by which the complementary punchings are offset one from the other is in each instance of the order of 0.015 inch. Accordingly the complementary records do not overlap each other when they are punched in consecutive horizontal normal rows and in the interstage row therebetween.

The apparatus for automatically testing statistical cards provided with complementary records as just described is shown in Figures 2, 3 and 4, Figure 2 showing a column of sensing pins, one for each data position of a vertical column of a statistical card. It will be understood that the sensing device may, as is known in the art, comprise as many columns as there are vertical columns of a statistical card to be tested but as each said column of sensing pins will be identical with that shown in Figure 2 it is considered sufficient to the understanding of the invention to describe only one column of pins.

From Figure 2 it will be seen that each sensing pin comprises a testing bar 17, and a testing pin 18, the testing bar being guided for lengthwise movement only in a straight line path in a vertical plane by a pair of guide plates 19, 20 and the testing pin 18 being guided for lengthwise movement in a vertical plane by guide plates 21 and 22, each of the plates 19, 20, 21, 22 being suitably slotted to permit said lengthwise movement of the parts 17 and 18 while the slotted apertures in the plates 21, 22 permit sideways movement of pins 18 in this plane of the column of pins. The parts 17, 18 are superposed as shown in Figure 2 and are in endwise abutting relation and the testing bar 17 is provided with a lateral abutment comprising a square pin 23 which is located in a window slot 24 formed in a testing plate 25. The arrangement of pins 23 and testing plates 25 with slots 24 and the manner of moving the testing plates 25 lengthwise is well known in the art and will not be described herein although the known mechanism for effecting the lengthwise movement of the testing plates in paths normal to the straight line paths of the testing bars 17 is shown at the right hand side of Figure 2.

The longitudinal axes of the parts 17, 18 when the axes are in alignment are so disposed that when a statistical card 10 is located in a sensing chamber formed in known manner by plates 26 and 27 and is aligned and arrested therein by a stop 28, the aligned longitudinal axes of the parts 17, 18, if extended, would pass through the center of an elongated perforation punched in the card in the sensing chamber. If, however, only a normal or non-elongated hole 13 or 14 should be in position beneath the sensing pin, the center of such normal hole will not be co-incident with the longitudinal axis of the sensing pin.

The testing pin 18, as shown in Figures 3 and 4, is provided with a shank 29, the width of which is such that it can enter an elongated perforation. From Figure 1 it will be observed that the length of an elongated perforation is 0.108 inch and the width of the shank 29 is 0.102 inch. In continuation of the shank is a downwardly convergent portion 31 terminating in a pilot portion 30 so dimensioned that when the sensing pin box is lowered towards the sensing chamber, the portion 30 will pass through a normal, now elongated, perforation 13 or 14 located beneath the sensing pin. In such circumstances, however, the convergent portion 31 will enter the perforation and engage the sides thereof so preventing the shank 29 from entering the perforation and supporting it in an intermediate position. The engagement of the convergent portion 31 with the sides of the perforation tends to center the testing pin 18 with respect to the perforation, as indicated at A, Figure 2. Accordingly, the testing bar 17 is raised against the action of a spring 32, which maintains the abutting relation between it and the testing pin 18, to an intermediate position at which the square abutment 23 is located in the vertical portion of the slot 24. Thus, when the testing plates 25 are moved lengthwise to effect testing, the plate 25 for the column containing the testing bar 17 in intermediate position will be prevented from moving lengthwise due to the disposition of the square pin in the vertical portion of the slot, thus indicating that an incorrect punching has been sensed.

If, on the other hand the sensing pin is disposed over an elongated perforation, when the sensing box is lowered with respect to the sensing chamber, the testing pin 18 will be moved so that the shank 29 thereof enters the elongated perforation as indicated by the testing pin B in Figure 2. In such circumstances, the abutment 23 is located in alignment with the lower horizontal portion of the testing slot 24, so that, when the plate 25 is moved lengthwise it is free to move relative to the testing bar thereby indicating that a correct record perforation has been detected.

It will be understood that perforations are not made in every index position on a card and accordingly when the sensing pin box is lowered with respect to the sensing chamber, those pins 18 in the box which are not aligned with record perforations in the card engage the top of the card as shown by the testing pin C in Figure 2 so that the testing pin and its testing bar 17 moves against the action of its spring 32 and the square pin 23 on the testing bar 17 is aligned with the upper horizontal portion of the testing slot 24.

From the foregoing it will be understood that if in a column one testing pin detects an elongated perforation as illustrated by the pin B and the other pins do not detect perforations, the testing plate 25 will be permitted to move normally to effect testing as the abutments 23 will, in all instances in that column, be aligned with the horizontal portions of the testing slot 24. It is only when one or more of the square pins 23 is a column is located in the vertical portion of the testing slot that the testing plate is prevented from performing its normal lengthwise movement during its operation. The lengthwise movement of the testing plates or the failure of such plates to move lengthwise can be employed, in known manner, to give an indication of an incorrectly perforated card detected as the result of the operation carried out by the apparatus just described.

We claim,

Apparatus for verifying perforated statistical record cards, comprising a column of testing bars, one bar for each data-indicating position of a data-recording column of a record card, a first pair of guide plates spaced apart lengthwise of the testing bars and cooperating therewith to permit movement thereof only in a straight line axial path, a window slotted testing plate supported for movement in a path normal to the straight line paths of the testing bars, an abutment extending laterally from each testing bar and located in a window slot appropriated thereto in said testing plate, a testing pin arranged in endwise abutting relation with each testing bar, a spring for each testing bar to maintain it in endwise abutting relation with the testing pin cooperating therewith, and a second pair of guide plates spaced apart lengthwise of the testing pins and cooperating therewith to permit movement thereof in a straight line axial path and to permit sideways movements of the pins only in the plane of the column of pins each said testing pin having the end thereof remote from the end engaged by its testing bar shaped for passage through an elongated perforation in a card and for partial passage through a non-elongated card perforation, the partial passage of said shaped end through a non-elongated card perforation causing its testing bar with the abutment thereon to be retained in a position such as to prevent effective movement of the testing plate relative to the testing bars.

References Cited in the file of this patent

UNITED STATES PATENTS

| Number | Name | Date |
|---|---|---|
| 1,866,748 | Brougham | July 12, 1932 |
| 1,984,516 | Brougham | Dec. 18, 1934 |
| 2,198,723 | Johnson | Apr. 30, 1940 |